United States Patent [19]

Colier

[11] Patent Number: 5,408,582
[45] Date of Patent: Apr. 18, 1995

[54] METHOD AND APPARATUS ADAPTED FOR AN AUDIBLY-DRIVEN, HANDHELD, KEYLESS AND MOUSELESS COMPUTER FOR PERFORMING A USER-CENTERED NATURAL COMPUTER LANGUAGE

[76] Inventor: Ronald L. Colier, T/L Apartments, 16 Cheshire Dr., Apt. 121, Pittsfield, Mass. 01201

[21] Appl. No.: 59,013

[22] Filed: May 5, 1993

Related U.S. Application Data

[63] Continuation of Ser. No. 733,586, Jul. 22, 1991, abandoned, which is a continuation of Ser. No. 559,028, Jul. 30, 1990, abandoned.

[51] Int. Cl.⁶ .............................................. G10L 9/00
[52] U.S. Cl. ................................. 395/2.52; 395/2.6; 395/2.4
[58] Field of Search ..................... 381/41–45, 381/110; 395/2.4–2.66

[56] References Cited

U.S. PATENT DOCUMENTS

| | | | |
|---|---|---|---|
| 3,742,143 | 6/1973 | Awipi | 381/41 |
| 4,408,096 | 10/1983 | Washizuka et al. | 381/110 |
| 4,426,733 | 1/1984 | Brenig | 381/43 |
| 4,677,569 | 6/1987 | Nakano et al. | 381/43 |
| 4,731,811 | 3/1988 | Dubus | 379/58 |
| 4,766,529 | 8/1988 | Nakano et al. | 395/2 |
| 4,776,016 | 10/1988 | Hansen | 381/42 |
| 4,799,144 | 1/1989 | Parruck et al. | 364/200 |
| 4,856,066 | 8/1989 | Lemelson | 395/2 |

OTHER PUBLICATIONS

Yavelow, "Voice Navigation For The MacIntosh Musician", Articulate Systems, Inc., 1989, pp. 1–4.

*Primary Examiner*—Allen R. MacDonald
*Assistant Examiner*—Michelle Doerrler

[57] ABSTRACT

The invention is a software driven methodology plus input processing circuit used to program a computer with instructions derived from user-spoken voice commands. Any "mathematical" or "logical" operation or combination of operations can be executed by a single user-spoken voice command. The hardware and software has two modes of operation, a training mode and an execute mode. In its training mode, the hardware is taught to correlate a specific operation or instruction displayed to the user, with his voice command. In its execution mode the software permits comparison of digital representations of received voice sounds with the stored digital representations of the voice commands. If the received sounds match one of the stored commands, the software creates the corresponding operations of the matched commands to be sent to the output circuitry for execution. The output circuitry similarly, translates the corresponding operations recalled by the software, into the proper analog, digital, or hybrid signals together with proper timing, etc., appropriate to the application of the invention, and performs the function requested.

2 Claims, 2 Drawing Sheets

METHOD AND APPARATUS ADAPTED FOR AN AUDIBLY-DRIVEN, HANDHELD, KEYLESS AND MOUSELESS COMPUTER FOR PERFORMING A USER-CENTERED NATURAL COMPUTER LANGUAGE

This application is a continuation of application Ser. No. 07/733,586, filed Jul. 22, 1991, now abandoned, which was a continuation of application Ser. No. 07/559,028, filed Jul. 30, 1990, now abandoned.

BACKGROUND OF THE INVENTION

1. Field of the Invention

This invention relates to sound created programs and instruction sets, and in particular to a circuit and methodology for acoustically inputting instruction sets and programs.

2. Description of the Prior Art

In general, computers have an input device, usually a keyboard, which allows the user to input information to the computer by depressing a key, or a combination of keys, or, as is usually the case, inputting information from storage devices such as tapes or disks.

Inputting information and programming or even using a commercially prepared program requires the user to understand, at some stage, the programmed functions of the commercially prepared program, or to master a computer language which will interpret or compile a keyed input. Keyboards range from simple 20-key calculator arrangements to over 100-key computer arrangements requiring simultaneous depression of two keys to initiate macrofunctions. Software operating systems, pre-prepared programs and computer languages, no matter how "user friendly", are characterized and consequently limited by the program's or language's design or structure, which is intended to make the computer's performance of a specific goal highly efficient. All computer languages are created to either: (1) tailor the language to a very specific field of application, such as COBOL to business or FORTRAN to math; or (2) to imbed in the computer, microcode, to permit the user to more easily create programs. What this "imbedding" does, is to limit the flexibility that the user has in using the software for different jobs. Thus Volkswriter, Lotus, Wordperfect are extremely "user friendly" in that they each use common everyday words or diagrams to permit the entry and printing of text. To try to use Volkswriter, Wordperfect, or Lotus to calculate the area of a circle or the molecular weight of a complex molecule is difficult if not impossible. This is because the creator of Volkswriter, Wordperfect, and Lotus had to imbed microcommands in their software to permit easy use of the macroinstructions for text processing, but difficult if not impossible use of their software for other applications. This imbedding by its very nature, limited the flexibility of the software package to the designated application, e.g. the typing, formatting, and inputting text for printing, etc. Comparably, there are other software programs which are very friendly to the physicist, astronomer, chemical engineer, etc., but very adversarial to a different disciplined user.

What is needed, and what this invention provides, is a method to permit any user, of any level of skill or of any discipline or background, to program a computer to perform whatever task the user understands and needs.

Thus, what is needed is a more user-friendly input mechanism to allow the user to more easily and quickly learn, remember, and access the functions and macrofunctions of the computer.

What is further needed is a method or apparatus to allow the user to more easily and quickly learn to program the computer in terms that are intimately familiar to the user.

What is further needed is a way to allow a user to create his own computer language tailored to his own specific needs instead of learning a new language.

What is further needed is an input system which would allow programming of a computer which could be used independent of the choice of human language.

BRIEF SUMMARY OF THE INVENTION

The invention is a software driven methodology and input processing device to be used in combination with a computer to allow the user to communicate with the computer using his own selected audible commands. In addition, it allows the user to "create" his own program from his own speaking language, which results in specific signals to the computer corresponding to the words selected by the user. The user is then able to use his own speaking language to program the computer. The user is able to combine basic algorithms he has programmed into the computer, into any number of complicated macrofunctions, each of which is activated by a user-selected audible command. The software plus computer system thus responds to voice commands with performance of the correct task.

The input processing circuit comprises a microphone, an analog-digital converter, a random access memory (RAM), an electrically erasable read-only memory (ROM) and a central processing unit. The microphone receives sound waves inputted or selected by the user. The analog signals from the microphone are smoothed, amplified, and converted by the A/D converter to a digital input signal representative of the inputted sound waves. The digitized input signal is temporarily stored in the RAM. The microprocessor is programmed to compare the input signal in the RAM to each of the approved signals according to a program stored in the ROM. If one of the approved signals matches the input signal in RAM, the microprocessor sends a signal to an output device, typically a computer or calculator. The signal will therefore be sent to the computer only if the "words" or other sounds created by the user are significantly similar to previously selected "words" or other sounds which the device has been trained to recognize.

These signals are used by the computer to generate algorithms or perform a function. These algorithms can be combined into macrofunctions which can also be programmed to be activated by being matched to another inputted verbal command. Ultimately, therefore, the macrofunctions are created and programmed from user-selected audible commands.

The invention is a software driven methodology used in combination with an input processing circuit and computer for performing a plurality of operations. The invention comprises a receiving circuit for receiving and amplifying a plurality of audible commands. A digital conversion circuit is coupled to said receiving circuit and converts each of said audible commands into a corresponding received digitized signal. A RAM storage circuit temporarily stores the received digitized signal. A command storage circuit stores a first plurality of user-programmed digitized command signals. Each of the user-programmed digitized command signals corresponds to one of the operations. A microprocessor circuit is coupled to the RAM storage circuit, and with the command storage circuit, compares the received digitized signal with each of the user-programmed digitized command signals. The microprocessor circuit determines whether any of the user-programmed digitized command signals matches the received digitized signal. An output circuit is coupled to the microprocessor circuit and to the computer, and generates a digital signal to execute the operation in the computer corresponding to a matched user-programmed, digitized, command signal. As a result, user-defined commands and programs constructed using user-defined commands, are audibly executed.

The software driven input processing circuit further comprises a selection circuit for allowing the user to select a plurality of programmed command signals stored in the command storage circuit.

The digital signal generated by the output circuit may be another user-programmed digitized command signal. The output circuit generates a digital signal which is used in an attached computer to execute operations corresponding to the other user-programmed digitized signals.

The audible commands are human voice commands. In other embodiments the audible commands are non-human animate sounds, inanimate sounds, or inanimate sounds generated by man-made sources.

The software driven input processing circuit further comprises an interchangeable storage circuit for interchanging the command storage circuit with one of a plurality of additional command storage circuits. The microprocessor circuit is coupled to a selected one of the plurality of command storage circuits. Each of the plurality of command storage circuits stores a plurality of user-selected programmed digital signals.

Alternatively the method further comprises interchanging the first plurality of user-programmed digital signals with a different plurality of user-programmed digital signals.

The invention can also be characterized as software driven hardware for providing user-defined intelligent responses to audible commands, comprising a microphone circuit for detecting the audible command and for converting the audible command into a digital signal. An identification circuit receives the digital signal and uniquely associates it with a user-defined digital command. A command circuit allows the user to selectively define the digital command using other user-defined commands, and a plurality of user-programmed commands.

As a result, the software plus hardware is configured to recognize a spoken request or program instruction with the "logic" or "intelligence" to permit the spoken requests and instructions to be converted into actions and eventually solutions.

The invention is still further characterized as a method for providing a user-defined intelligent response to an audible command comprising the steps of detecting the audible command and converting the audible command into a digital signal. The digital signal is uniquely associated with a user-defined command. The command is selectively defined by the user using other user-defined commands and a plurality of user-programmed commands to produce the response.

In the various embodiments in the step of storing the operations corresponding to user programmed digitized command signals, the operations are, for example, calculator operations, typewriter operations, inventory control operations, CAD/CAM operations, or numerical machine control operations.

The invention can better be visualized by turning to the following drawings.

The invention and its various embodiments can better be understood by turning to the following detailed description.

DETAILED DESCRIPTION OF THE PREFERRED EMBODIMENT

The invention is a software driven methodology used in combination with an input processing circuit and a computer to allow the computer to be programmed with instructions derived from user-selected, voice commands. In a preferred embodiment, the computer is a conventional desk-top calculator comprising a calculator chip and LED display but without a keyboard, but with the very basic instructions, namely add, divide, subtract, multiply, store, clear, and the like, preset as algorithms in the computer. The circuit and computer or calculator has two modes of operation, a training mode and an execute mode. In connection with the desktop calculator of the illustrated embodiment, the words "computer" and "calculator" below will be interchangeably used. However, it must be understood that a general purpose computer can be used in combination with the circuit which is described.

In its training mode, the circuit and computer is "taught", via the software, to correlate a specific operation or instruction with a voice command. In the preferred embodiment, forty of these operations are associated with forty corresponding voice commands. The digital representation of the sound corresponding to the voice command is stored in the circuit in association with stored operations or instructions for the calculator.

In its execution mode, the circuit and computer compares digital representations of received voice sounds with the stored digital representations of the voice commands. If the received sounds match one of the forty commands, the circuit allows the corresponding operation(s) of the matched command to be sent to the calculator for execution.

Additionally, the circuit and calculator, when operated together under software control, have voice programming capabilities in which the system is "taught" to identify any combination of calculator operations, with a single voice macrocommand. Digital representations of these "macrocommands" are then stored in the computer. Alternately, keys on a general keyboard can be assigned, by voice macrocommands, such that after assignment by the user, the user may alternately depress the assigned key to recall and calculate a lengthy formula using previously voice-inputted numeric values for the variables in the formula, instead of recalling the formula by voice request.

Figure 1:
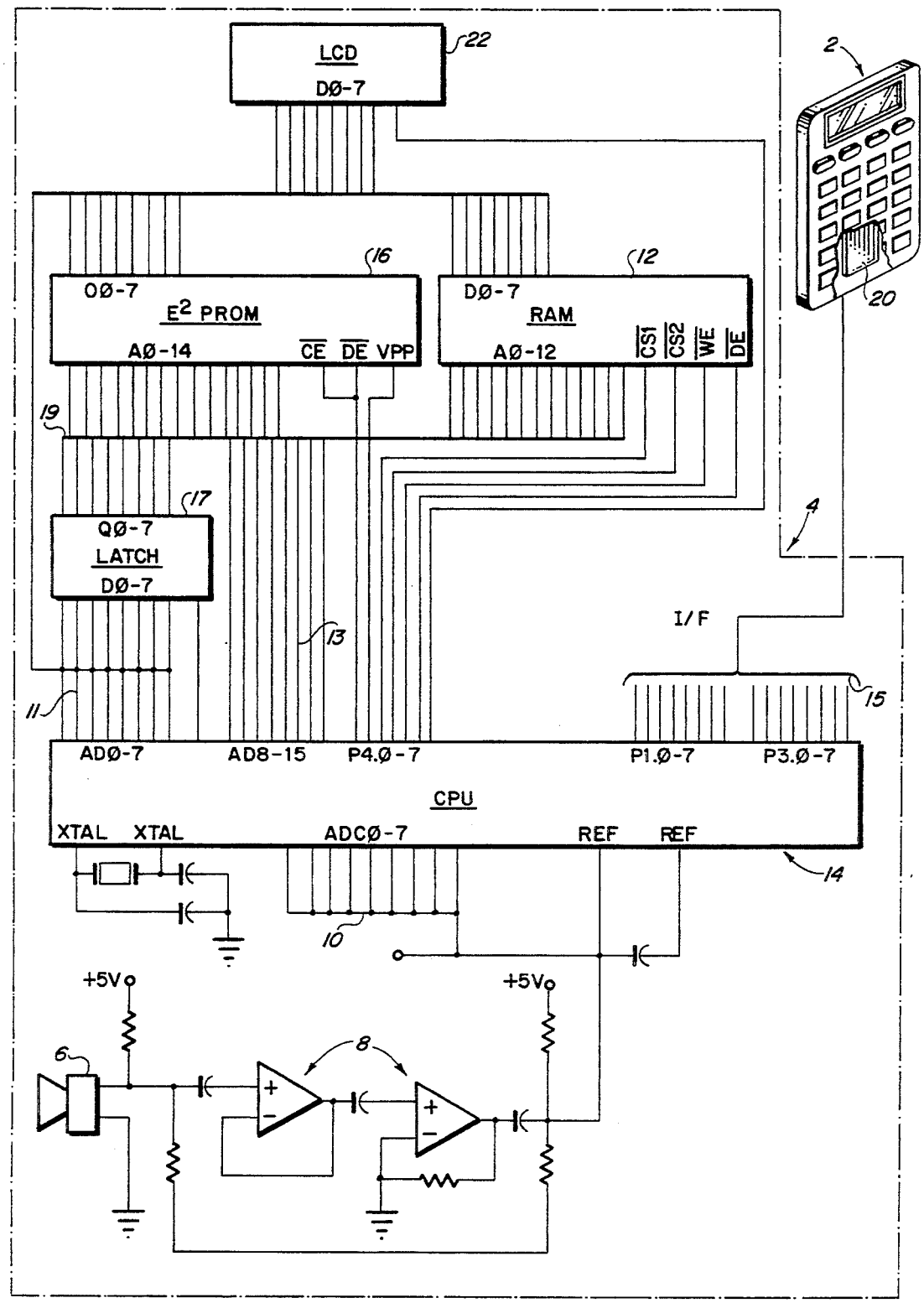
FIG. 1 is a simplified schematic diagram of a circuit incorporating the invention.

Turn now to FIG. 1 which is a block diagram of the hardware of the invention. As discussed, the circuit, generally denoted by reference numeral 4, can be combined with a computer, calculator, or output device, but the preferred embodiment of FIG. 1 shows a conventional desk-top calculator, generally denoted by reference numeral 2, being combined with circuit 4. The elements of circuit 4 include a microphone 6 having its output coupled to amplifier 8. Amplifier 8 in turn has its output coupled to an analog-to-digital (A-to-D) converter 10, included as part of microprocessor 14. Microprocessor 14 has an eight bit address/data bus 11 coupled through address latch 17 and an eight bit address bus 13, both of which are coupled to memory bus 19. A RAM 12 and EEPROM 16 are coupled to bus 19. Microprocessor 14 also has a control and I/O bus 15 coupled as appropriate to various control terminals of RAM 12 and EEPROM 16 and to calculator 2. In the illustrated embodiment a Signetics 87c is used for microprocessor 14.

Microphone 6 receives a voice command. Microphone 6 is a differential ambient noise insensitive microphone or alternately microphone 6 is shielded physically enough to dampen external noises. Also, an extension microphone may be used. Amplifier 8 amplifies and conditions the analog signal. A-to-D converter 10 within microprocessor 14 takes an appropriate number of samples; at least 6,000 samples for the human language of the "word" spoken in roughly one second of operation. A-to-D converter 10 samples and holds and converts the input to digital bit stream.

RAM 12 is an 8K random access memory with a capacity of essentially one "word". RAM 12 temporarily stores the digital representation of the word for comparison with previously stored data.

Microprocessor 14 performs several functions. It contains an FFT (Fast Fourier Transform) converter to generate a characteristic function of the word. The characteristic function of the inputted word is then compared with the characteristic function of the previously stored words by means of a correlation function. The best fitting word is chosen provided that its correlation is greater than a predetermined threshold. Microprocessor 14 compares the digitized single "word" temporarily stored in RAM 12 with previously stored commands and "macrocommands" stored in EEPROM 16 as described below.

EEPROM 16 is a 16K bit electronically erasable programmable read-only memory. EEPROM 16 stores the commands and "macrocommands" to be used for comparison with the received digitized "word".

Circuit 20 within calculator 2 receives a computer input/bit-mapped output from I/O bus 15 of microprocessor 14 to respond to the input. Alternatively, computer serial interfaces or analog outputs could be present. Display 22 is a LED display normally associated with a calculator. It is used to display the "word" to be spoken into the microphone 6 as well as the results of calculations.

Training Mode

Figure 2:
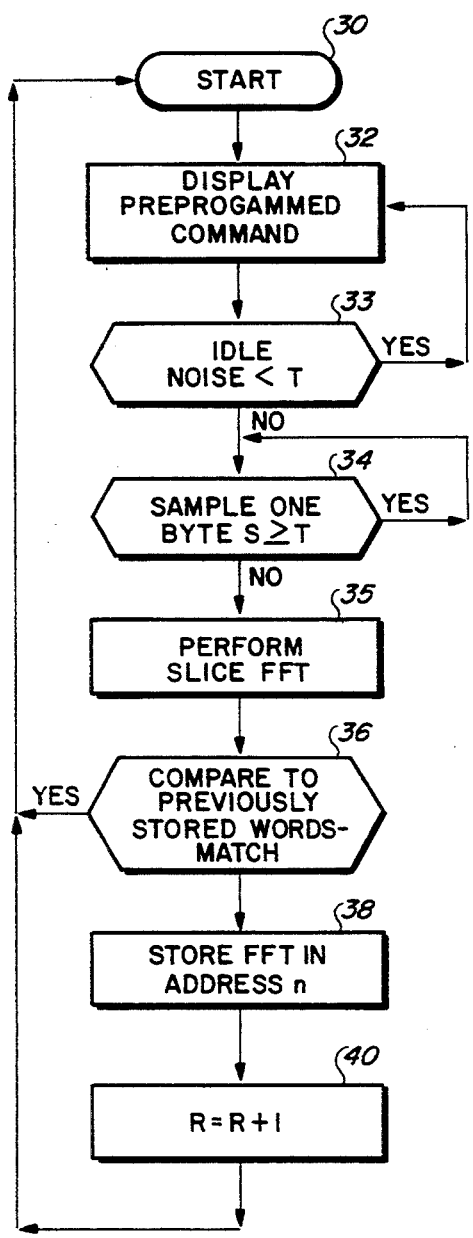
FIG. 2 is a flow chart of the methodology performed in a training mode.

Turn to FIGS. 1 and 2 to see how circuit 4 is trained to identify each of a plurality of voice commands. The user first depresses a "training" key on the calculator at step 30, which sends a signal to microprocessor 14 to begin a prestored program whose logic is shown in FIG. 2.

The first of forty words is displayed in display 22 at step 32. For example, the word "ONE" might be the first word displayed. The program is now ready to receive and store a digital representation of the word "ONE". Upon seeing the word "ONE" displayed, the user speaks into microphone 6 pronouncing the word "ONE". The analog signal of the word "ONE" is sent to amplifier 8 where the signal is smoothed and amplified.

The A-to-D converter 10 is in an idle state at step 44 in FIG. 3 as long as the signal input level is below a predetermined threshold. When a sound above the threshold level is received, A-to-D converter 10 converts the signal at step 46 into a digital representation of the word "ONE", which is then temporarily stored in RAM 12. Conversion continues as long as the sound level is above the predetermined threshold.

Two considerations exist when detecting the completion of the spoken "word"; one is the time permitted before a second "word" is to be sensed, and second is the question of the level of the threshold vis-a-vis the background noise, during and between spoken words.

Generally speaking, a time-out usual for the language of the user will be preset in the circuitry. Thus if we assume that 1.5 seconds is adequate for the English language, the entire power spectrum above the threshold level and for 1.5 seconds after dipping below the threshold will be digitized and used for autocorrelating to recognize a word. The circuitry assumes that only one word will be digitized during this total period. This time-out interval is naturally changeable and presettable by the manufacturer. It is a measure of how quickly a second word is spoken after the previous word, and while any time interval is within the capability of the invention, for the purposes of this example, 1.5 seconds is assumed.

Microprocessor 14 then performs a Fast Fourier Transform at step 48 on the received digitized signal and an auto-correlation of the digital representation of the word "ONE" with the digital representation of all commands and macrocommands stored in EEPROM 16 at step 36.

Microprocessor 14 then compares at step 36, the digital representation of the word "ONE" stored in RAM 12, with the digital representation of all of the commands stored in EEPROM 16. In this example, the word "ONE" is the first inputted word. Therefore no other commands are stored in EEPROM 16 at this time. Since there are no other commands, the digital representation of the word "ONE" is determined not to match any other digital representations in EEPROM 16. Since the learn mode has been selected, the digital representation of the word "ONE" is therefore stored at step 38 in EEPROM 16 in its first address. The voice envelope for the word "ONE" is now the first command. If a basic algorithm like add or subtract had been preset in the computer to correspond to the identification of the word "ONE", then that algorithm would be activated by identification of that word. If the word "ONE" was preset to be identical to the number 1, then identification of the word "ONE" would activate the number "one" for further calculation.

Circuit 4 has thus been programmed to generate the operation corresponding to the algorithm preset in the computer for the number 1 when the voice command stored in the first position in EEPROM 16 is matched with a received word "ONE" during the execute mode.

A counter then moves to the second position in EEPROM 16 at step 40 and the methodology returns to step 32. Display 22 now displays the word "TWO" and circuit 4 is now ready to receive the voice command with which the user desires to represent the word "TWO". The word "TWO" is spoken, received, amplified, converted, and stored in digital form in RAM 12.

Note that the storage and matching of the spoken word with the stored word is human language independent, i.e., a Spanish user can equally well use the same computer as an English user, without any software modification.

Microprocessor 14 then compares at step 36 the digital representation of the word "TWO" stored in RAM 12 with the digital representations of all commands stored in EEPROM 16, which at this time is limited to the first command, the word "ONE". If the digital representation of the word "TWO" is too similar to the digital representation of the word "ONE", there is a match and nothing is stored in the second address in EEPROM 16. The user is then requested to input another word to represent the word "TWO" by returning to step 32. If there is no match, the digital representation of the word "TWO" is then stored in the second position in EEPROM 16 at step 38, which is pre-programmed to result in an operation associated with the algorithm or number assigned to the word "TWO".

This process continues until the user has filled forty positions in EEPROM 16 with a digital representation of the forty key words or numbers.

Another computer might have all the letters of the an alphabet displayed in the training mode, which then makes the system human language dependent. Letters could just as easily have corresponding voice commands stored in EEPROM 16, as numbers or mathematical operations. In fact, the representative digital signal of any word, number, letter or function, which can be sent to a calculator circuit via a keyboard, can be sent to circuit 4 by storing it in one of the addresses in EEPROM 16. The corresponding operation is then accessed by matching a "word" with a received voice command.

Circuit 4 is similarly taught to identify other training words such as "assign", "equals", "define", "new", "list", "recall", etc., to be used in programming. Each of these programming commands is pre-programmed to perform certain functions, which allows the user to create macrocommands from the basic algorithms already stored or hardwired in the calculator.

Execute Mode

Figure 3:
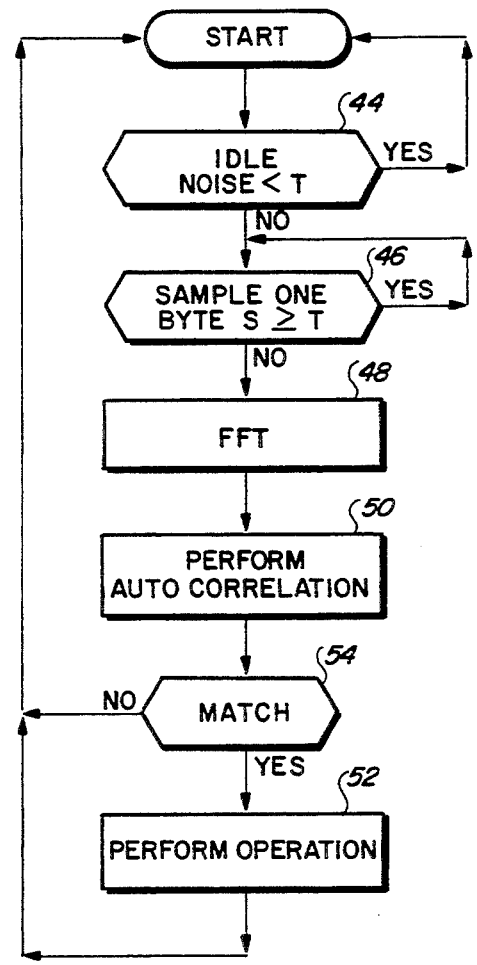
FIG. 3 is a flow chart of the methodology performed in an execution mode.

Turn now to FIG. 3 to understand how circuit 4 executes the user's voice commands and macrocommands. The user depresses an "Execute" key which tells the computer to begin the pre-stored program whose logic is shown in FIG. 3. The program is ready to receive and compare the digital representation of a received "word" with the digital representations of the commands and macrocommands stored in EEPROM 16.

The user speaks a "word" into microphone 6. For example, the user might pronounce the word "ONE". The analog signal of the word "ONE" is sent to amplifier 8 where the signal is smoothed and amplified. The A-to-D converter 10 is in an idle state at step 44 in FIG. 3 as long as the signal input level is below a predetermined threshold. When a sound above the threshold level is received, A-to-D converter 10 converts the signal at step 46 into a digital representation of the word "ONE", which is then temporarily stored in RAM 12. Conversion continues as long as the sound level is above the predetermined threshold.

The minimum threshold level will be developed "on the fly". This means that while a fixed value will be "called up" when the device is turned on, this fixed value will be altered by measurements made during the process. Thus, after recognizing a word, the measured power correlation will be subtracted from the "exact" power correlation (the power correlation associated with the word from the training mode). This difference will be averaged, and then averaged with the fixed value. This new value will be used for the next recognition process and so on. Thus, a running integration of the background noise will be averaged with the fixed correlation difference acceptable for high detection, therefore including in the recognition process, the environment of the user.

Microprocessor 14 then performs a Fast Fourier Transform at step 48 on the received digitized signal and an auto-correlation of the digital representation of the word "ONE" with the digital representation of all commands and macrocommands stored in EEPROM 16 at step 50. In this example, assuming that the user's pronunciation of the received voice command (the word "ONE"), was within a predetermined degree of similarity with the stored voice command of the word "ONE" (and, since only those who have "trained" the hardware should use the system, this degree of similarity will be very great), the microprocessor will send a prestored digital command for the word "ONE" associated with the first address in EEPROM 16, to calculator circuit 20 at step 52. If the autocorrelation at step 50 fails to show a match, then a reinput of the command is requested at step 54 with processing returning to step 46.

The program is now ready to receive the next "word". In this example, let us say that the user pronounced "plus". The digital representation of the word "plus" is compared to the commands. Let us say that the command "plus" had previously been stored, in the training mode, in address 32 of EEPROM 16, and circuit 4 was pre-programmed to call-up the algorithm associated with "+" in the calculator when address 32 of EEPROM 16 was matched. At this time address 32 is matched and the calculator circuit performs the function associated with "+".

Let us say that the user now speaks the words "ONE" and "equals". It is clear that the circuit 20 has now received operational digital signals, in response to the user's four input words, to add "ONE" plus "ONE"'and display the result.

In this fashion, the calculator circuit receives all inputs of the correct form, from voice commands. Given this capability, the user is now in a position to use his voice commands to program the now voice-operated calculator to perform macrofunctions of his own choosing tailored to his own needs.

Programming

Calculator circuit 20 will contain very basic mathematical algorithms, like "add", "subtract", "multiply", "square root", etc. Basically it will contain all mathematical algorithms which are required to perform all sophisticated calculations as well as all mathematical calculations in physics, chemistry, biology, marine engineering, astronomy, etc. The user will be able, by voice, to create macrocommands, to program, calculate, or perform a wide variety of functions associated with one or more of the disciplines mentioned, or to erase and/or store the calculation or function defined by voice assignment or assigned to one key, and replace it by voice commands with another of his choosing.

In geometry, the distance between two points in a plane is the square root of the sum of the squares of the coordinates of the two points. To create a macrocommand to calculate the distance between any two points, given the differences in the coordinates, one would say the following. "New" "Algorithm". Each word has been preset into the circuit as the basic set of commands; the word "new" indicating a new function is to be programmed into the circuit; the word "algorithm" indicates to the circuit that a macro is to be defined. "Assign" "Name" "Distance". Distance is to be the name of the algorithm. "Assign" "X", "Assign" "Y", "D" "Equals" "Square Root" "Quantity" "X" "Squared" "Plus" "Y" "Squared" "End Quantity". "Display D", or "Display Symbols" "Distance" "End Display D". Thereafter the algorithm is called by the voice command "Distance", and may be recalled by voice, or with further voice commands be assigned to a key which will recall it. Calculations of the distance between two points in a plane can now be performed simply by giving the circuit voice assignments of the variables, namely "X" "Equals" "1", "Y" "Equals" "Two," "Calculate Distance", "Display".

The command "Distance" can then be used as an element in other newly created commands to build up to higher levels of abstraction. The higher the level, the more nearly like human speech the commands become. Since the command terminology and logic is user-created, the computer language which it comes to represent is specifically customized to both the application and to the user. This adaptability to the user's specific application and to the user's logic and terminology results in a user-friendliness heretofore unachieved.

In this example words like "equals", "square root", "assign", "squared", etc., will have been stored in the circuit as part of the basic set of algorithms to perform all mathematical and/or user-defined functions for all disciplines of learning. Words such as "Distance", will be read into the circuit by the user, as part of his particular discipline (namely geometry).

The user may recall a particular formula by saying "Recall", and then speak the letter or number or name of the formula into the circuit. Also, by speaking phrases such as "List", the circuit could display on the screen a summary list of all stored formulae. Naturally this would require the user to have previously spelled audibly the defining algorithm into the circuit, such as "Molecular Weight" spelled letter by letter to permit the circuit to display such names of formulae when "List" is requested.

The formulae need not be limited to arithmetical computations, but may include the processing of information as well. If an inventory clerk were to walk down the aisle of a large warehouse to add the number of items for several items stored in the warehouse, instead of writing the numbers in a column on a clipboard, he could simply speak into the microphone such preprogrammed user-defined words as "Item" "shoes", "size 10" "Quantity Twenty"; "Item" "shoes", "size 9½" "Quantity Ten"; "Item" "shoes", "size 9" "Quantity thirty"; etc. This data would then be stored in appropriate locations in storage for later callup for inventory calculations.

In addition to information processing, control of manufacturing or physical processes is contemplated. Such a use would be to assign, by voice, voltage and current outputs of control devices in an industrial plant. If for example, engine turbines would start by the sensing of a 5 VDC voltage level on a pin 1 of a control circuit, or the valves on a hydroelectric plant switched by the sensing of a 1-amp current on a pin 2 of a command circuit, then an operator need simply say "Assign" "Pin" "One" "Five" "Volts" "Assign" "Pin" "Two" "One" "Amp", etc. Further, the calculator circuit itself could be installed as part of a remote console close to the operator, and the controlled equipment itself situated at a distance from the operator. Macroinstructions could then be built up by the user which would eventually result in operation of an engine or turbine simply by saying, "turbine" "number" "5" "start" or "valve" "number" "3" "switch". Alternately, the system could be installed as part of numerical control machines or circuit card test fixtures. The movement of the cutting blades or test probe could be controlled by macroinstructions created by the user in his own speaking language. Since X, Y, Z coordinates and fixed figures, like rectangles, squares, resistors, capacitors, instructions for electronic circuit testing, mechanical designs, etc., are entered manually on a keyboard by an operator of a numerical control machine or CAD/CAM display or automated drafting board, these same coordinates and stored fixed figures can be verbally entered into the system. Control of a jig, bore, drafting pen, or CRT electronic cursor is thus controlled by the user's speaking language.

In addition to connection to a personal computer or computer circuitry, connection to an ASCII-controlled electronic typewriter is possible. This would permit not only limited vocabulary typing, but voice programming of carriage movements as well. The commands used not only permit insertion of a limited number of words into specific places on fixed forms, but by user-created macro instructions, completion of repetitive forms with different data could be accomplished. Instructions such as "Line" "Two" "Position" "18" "type" "X"; "Line" "Four" "Position" "Three" "type" "Sentence 25"; "Line" "Thirteen" "Position" "One" "type" "Numbers" "One" "Nine" "Nine" "Zero", can be spoken and identified. The proper actions will thus have been performed under voice direction. Ultimately, automatic tabs could be assigned for each different form, identified by form number, and automatically triggered by speaking the words "TAB Next", after entering the correct data in each space. At a higher level of abstraction the macrocommands can be renamed under a form name so that multiple commands can be executed with voice input of variables just by stating "Form 1040".

To more graphically describe the power of the system to permit the user to create macroinstructions and MACRO subroutines by voice, the following inventory control application is described in detail.

To program the previously described inventory control system further, the following can be done. Preset into the circuit are the following—

The numbers would be prestored; namely:
zero, one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, hundred, thousand, million, billion, trillion, half, third, fifth, single, double, triple.

Note that only different numbers are included (e.g., twenty-five is not; one-eighth is not, but the term "th" is included in general words and algorithms with fractions being included as part of the numbers and the expression "th" such as one-eighth included as part of general words).

The letters would be prestored; namely: a, b, c, d, e, f, g, h, i, j, k, 1, m, n, o, p, q, r, s, t, u, v, w, x, y, z (say, English). Letters are used to "spell" words when non-preset words are required for display or printing, but will also often be used to represent concepts (such as "Gucci" shoes described below). By linking the concept, to the preset "letters of the alphabet", the user will be able to create macroprograms based upon variables rather than being stored on their own. By then assigning the variables other concepts such as "Stetson" hats rather than "Gucci" shoes, a user may use the same large program he has created for shoes (such as an inventory counting program or a sales projection program), for hats or any other items of merchandise he chooses without having to rewrite the program.

Mathematical algorithms are included; namely: add, subtract, plus, minus, multiply, divide, equals, less than, more than, square, square root, integral (from A to B), differential, exponent (e) or base (10), infinity, absolute (value), fraction, sum, calculate, total.

General algorithms are included such as list, algorithm, assign, pronounced, "th", end, display, date, spell, space, same as, recall, store, number, storage, replace (A with B), duplicate, execute.

The clerk speaks into the microphone:
"A" "Same As" "Spell" "G" "u" "c" "c" "i" "End Spell" Pronounced" "Gucci" "End"
"B" "Same As" "Spell" "L" "o" "n" "d" "o" "n" "End Spell""Pronounced" "London" "End"
"C" "Same As" "Spell" "W" "a" "l" "k" "R" "i" "t" "e" "End Spell" "Pronounced" "Walk Rite" "End"
"D" "Same As" "Spell" "B" "r" "o" "w" "n" "End Spell"
"Pronounced" "Brown" "End"
"E" "Same As" "Spell" "R" "e" "d" "End Spell" "Pronounced" "Red" "End"
"F" "Same As" "Spell" "B" "l" "a" "c" "k" "Pronounced"
"Black" "End"
"G" "Same As" "8½" "End"
"H" "Same As" "9" "End"
"I" "Same As" "9½" "End"
"J" "Same As" "Spell" "S" "i" "z" "e" "Pronounced" "Size"
"End"

As mentioned, the assignment of letters for the different types of shoes permits the user to create a program for shoes and then apply that program to other items of merchandise by redefining the letters.

The inventory clerk then speaks into the microphone the following:
"Gucci" "Brown" "Size" "9½" "Quantity" "30" "Store"
"UU" (thus ADJI is quantity 30, stored in location UU)
"Gucci" "Black" "Size" "8½" "Quantity" "20" "Store"
"VV" (AFJG is 20)
"London" "Brown" "Size" "9" "Quantity" "30" "Store"
"WW" (BDJH is 30)
"London" "Black" "Size" "9½" "Quantity" "50" "Store"
"XX" (BFJI is 30)
"Walk Rite" "Red" "Size" "8½" "Quantity" "80" "Store"
"YY" (CEJG is 80)
"Walk Rite" "Brown" "Size" "9" "Quantity" "30" "Store"
"ZZ" (CDJH is 30)

After inputting all data into the circuit via voice, the clerk retrieves the total quantities of Gucci shoes sold, by requesting the "total" of all quantities associated with, say, the word "Gucci" or "A".

A sample program execution may be tabularized as follows.

| Clerk's Vocal Command | LED Display |
|---|---|
| "Total" "Gucci Quantity" "Display". | 50 |
| | (ADJI plus AFJG) |
| "Total" "London Quantity" "Display". | 80 |
| "Total" "Walk Rite Quantity" "Display". | 110 |
| "Total" "8½ Quantity" "Display". | 100 |
| "Total" "9 Quantity" "Display". | 60 |
| "Total" "9½ Quantity" "Display". | 80 |

Since such a program will most likely be used daily, the original assignments, assigning "A" to "Gucci", "B" to "London", etc., need only be inputted once at the outset. If a "Store Date" algorithm puts all data from the day's totals into storage with the date associated with it, then "Recall Date" would retrieve such data and place it in main memory with the date before it to identify it. Then "Recall" "Gucci" (yesterday's) "Date" recalls all Gucci data into main memory from yesterday. "Gucci Quantity" "Total" "Minus" (yesterday's) "Date" "Gucci Quantity" "Total" "Calculate"; calculates for display, the net number of Gucci shoes sold today.

With the following data inputted at the beginning and assigned to "Y":
"Gucci" "Black" "Size" "9½" "Equal to" "$145.00",
"Gucci" "Brown" "Size" "9½" "Equal to" "$140.00",
"London" "Black" "Size" "9" "Equal to" "$160.00",
"London" "Brown" "Size" "8" "Equal to" "$155.00",
"Walk Rite" "Black" "Size" "9½" "Equal to" "$85.00",
"Walk Rite" "Red" "Size" "8½" "Equal to" "$95.00",
then "Multiply" "Quantity" "Link" "Gucci" "Black"" Size" "9½" "End Link" "Times" "Storage Y" "Display" does the following: with the "Link" algorithm linking all words spoken until the word "End Link", the LED response would be the total amount of money taken in from the sale of Gucci shoes, black, size 9½.

"Multiply" "Quantity" "Link" "Gucci" "Brown" "Size" "9½" "End Link" "Times" "Storage Y" "Display", displays the same figure for brown Gucci shoes, size 9½. "Multiply" "Quantity" "Link" "London", etc. displays the receipts for London shoes. "Multiply" "Quantity" "Link" "Walk Rite", etc., displays the receipts for Walk Rite shoes.

If each of these figures were stored in separate storage locations, a command "Total" "Storage" "Gucci" would display the day's receipts from Gucci sales, with the same for London and Walk Rite, and "Total" "Storage" "One", "Two", "Three", etc. could display the day's total receipts from all shoe sales.

Expressly included also is the ability to cancel non recognition of words not necessary to the identification of the request. Thus a user could say:
"Display the total number of Gucci receipts today" "Execute", (underlined words recognized; remainder ignored), where "receipts" was made equal to "dollars" or "cents", the user would be able to retrieve the same data as before.

Since the previous day's receipts, quantities, etc. can be stored daily and depend only upon storage size, trends of data can be recalled and analyzed. Thus, with a printer: "Quantity" "Link" "Gucci" "Black" "Size" "9½" "End Link" "Recall" "Storage A" "Storage B" "Storage C" ... "Storage X", "List" "Print", "Printer", "Execute" lists, on the printer, all quantities sold for Gucci shoes, color black, size 9½, from day "A" through day "X", day by day.

Similarly, "Receipts" "Link" "Gucci" "Black" "Size" "9½" "Recall" "Storage One, Two, Three ... N", lists the receipts for all Gucci shoes, color black, size 9½, day by day, for the past "N" days, on the printer.

Since recalling past day's receipts or quantities would be a common occurrence, the recall program could be preprogrammed and stored, and the user would simply say, "Recall" "Receipts" "20" "Days" "Past" or "Recall" "Quantities" "30" "Days" "Past". For further analysis, the following may be performed: "Differential" "Recall" "Storage" "A" "Storage" "B" "Store T"; "Differential" "Recall" "Storage" "B" "Storage" "C" "Store U"; "Differential" "Recall" "Storage" "C" "Storage" "D", etc. "Store V", etc.

If differentials subtract the quantities of the two items recalled, then this operation calculates the individual differentials between each two consecutive points on a sales curve storing them in storage locations "T", "U", "V". etc. "Total" "Storage T" "Storage U" "Storage V" "Storage W", etc. "Store Z" "Divide" "Store Z" "Quantity" (say) "23" (the total number of days of data to be averaged) "Store ZZ", calculates the average slope of the curve and stores it in "ZZ". This, then, is the slope of the curve of the number of shoes sold over the past 23 days. Then: "Add" "Store ZZ" "plus" "Store X", "Store AA" "Same As" "Day One"; "Add" "Store ZZ" "plus" "Store AA", "Store BB" "Same As" "Day Two"; "Add" "Store ZZ" "plus" "Store BB", "Store CC" "Same As" "Day Three", all the way to Day "N", etc. calculates a simple straight line projection of sales for shoe sales for days 1, 2, 3 ... N days after day 23 and stores the points in locations "AA", "BB", "CC", etc. "Print" "Printer" "Store AA", "BB", "CC", etc. "Execute" would then be a list of the estimated number of shoes to be sold each day for the next N days, using a simple straight line projection of past sales.

Similarly, projections can be created using more complicated projection averaging methods using shoe size, color, manufacturer, cost (as well as sales price), for each item, giving the ability to estimate the cost of inventory necessary to resupply stock (over the next N days). In addition, estimated sales can be calculated, to aid in managing finances, and projections of estimated sales made over these N days. Thereby projected sales for the next "N" days and an estimate of profits to be made, day by day, over the next N days can be calculated and printed.

Since projections of this nature would be a recurring request, all of these programs can be stored for later use, requiring only the latest data to be inputted on quantity, receipts, etc. If this program is called "PROJECTION", and recalled automatically whenever the word "Projection" is recognized, then employing the cancel nonrecognition feature, the capability to generate the following is expressly contemplated: "Print on the printer a projection of the total number of shoes to be sold each day, for the next 90 days", as a simple human language, verbal request, with the system responding on the printer with the projected sales data requested.

In addition to human voice commands, inanimate or nonhuman sounds could also be used as audible commands. For example, the sounds emitted by a piece of machinery, such as an engine, or of a structure, such as a building or air frame, or of the earth such as prior to an earthquake, could be monitored and compared to the emission of a characteristic sound indicative of an impending malfunction or operational characteristic. That sound would then be interpreted directly as a computer instruction causing a complex set of user-defined instructions or responses to be undertaken. Animal sounds could be used in the same way for commands, thereby allowing the uniquely identifiable bark of a dog or other trained animal to initiate an action, such as the dispensing of food, the opening of a dog door, or the activation of a security system.

Expressly included is the output not only of digital signals to perform all of the functions described in the previous pages, but analog signals driving analog circuitry and analog-based machines, and the creation of, or recall of, audible responses to the input voice.

The language claimed, as opposed to the hardware or methodology, is a subset of the English language, but created expressly for the spoken programming of the claimed hardware. Out of necessity, human language must be used to program and "instruct" a circuit; the English language is used herein, but identical words in all human languages are included. While it is conceivable to "communicate" with a computer, and program a computer, in other than human language, it is easiest to communicate and hence instruct a computer in the language of the human operator.

All computer languages to date suffer from performance limitations, which are accepted in order to make the computer system efficient at one particular application or language. Thus, as described, all computer languages are either very specifically adapted to solve problems in one area such as physics or astronomy, or flexible only for a general class of tasks, such as text composition or formatting, but inflexible for other tasks.

What has been created here is a set of instructions based upon a human language subset, geared toward the spoken word. What this does is free the user to use his own choice of single or combinations of spoken words, to build algorithms and to build composite algorithms from those, to instruct the computer to perform computer-related tasks. This set is described below, and is the minimum set deemed necessary to perform all of the functions which can be performed in the hardware of the illustrated embodiment. This set is deemed minimum for the English language, but speaking variances, language to language, require a variety of different minimums, depending upon the language. For ease of use by the user, additional words may or may not be included for specific applications, to make verbal interaction easier for the user.

Preset into the circuit of the illustrated embodiment are at least one set of the instructions set out in the Table 1 below. For the purposes of the claims below, the term "minimum set" is defined as the instruction set for the English language, with other "minimums" defined by the human language serviced.

TABLE 1

Appendix

Numbers: zero, one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, hundred, thousand, million, billion, trillion, half, third, fifth, single, double, triple.

Note that only different numbers are included e.g., twenty-five is not, one-eighth is not, but the term "th" is included in general words and algorithms.

Letters: Letters are used to "spell" words when non-preset words are required for display or printing, but will also often be used to represent concepts.

Math Algorithms: Add, subtract, plus, minus, multiply, divide, equals, less than, more than, square, square root, integral (from A to B), primary number, differential, exponent (E), base (10), infinite, quantity, absolute value, fraction, sum, calculate, total.

General Algorithms: List, algorithm, assign, pronounced, "th", end, display, date, spell, space, same as, recall, store, number, storage, replace (A with B), duplicate, execute.

It should be noticed that the numbers listed above are only the different numbers used in the spoken vocabulary; the number twenty-five is obviously a spoken "twenty" and "five". The letters are the letters of the alphabet of the human language (English, Greek, Russian, etc.) being employed by the user. The math algorithms are primarily self-explanatory and identical to the usually hardwired or firmware algorithms preset in conventional calculators. The General Algorithms need some explanation, given below, but are primarily just the common-sense meaning of a word—"List" meaning "to list"; "Pronounced" meaning "how something is pronounced":

General Algorithm Explanations

Quantity: used mathematically, generally associated with brackets as "Quantity" "A" "plus" "B" being [A+B]. If linked to another word such as "sum" then it means the number of the items totalled.

Sum: to add more than two items; generally used as a command saying "Link" "Gucci", "black", "size 8½", "End Link", "Sum" meaning "Sum" quantity of all items of the type linked.

Calculate: used as a command to request the circuit to insert the values of the variables spoken (e.g., X=1, Y=2) into the formula, and calculate the result.

Total: similar command to "Calculate" but also used to sum items.

List: depending upon the words preceding it, a command which displays the list of, say, "Algorithms" "assigned" in memory.

Algorithm: tells the circuit that an algorithm is to be defined, where Algorithm is used in the general sense to include formula.

Assign: a command which tells the circuit (depending upon the words which precede or proceed it) to "define" "A" as "B" such as "A" "Assign" "B", or "Link" "Gucci" "black" "size" "8½" "End Link" "Assign X" means X is identical to the words "Gucci black size 8½". Thus, "Quantity" "X" "Total" would mean the total number of Gucci black size 8½; "Dollars" "X" "Total" would mean the total number of dollars assigned to, or received from, Gucci, black, size, 8½, sales.

Pronounced: used to define the sound of a word after it is spelled, such as "Spell" "M" "O" "L" "E" "C" "U" "L" "A" "R" "W" "E" "I" "G" "H" "T" "End Spell" "Pronounced" "Molecular Weight". This permits any word to be entered into the circuit and displayed on the LED whenever it is spoken. The use of the word, of course, must be defined by an algorithm, as a "definition", or a Program name, etc..

End: a command to indicate the proceeding command operation is finished, such as "End" "Link" or "End" "Spell".

Date: verbally inputted, it attaches the day's date to any data associated with it, such as "Store" "Gucci" "Date".

Spell: a command indicating all letters following until the command "End Spell" is heard, are to be linked, stored, and displayed on the LED.

Same As: used to indicate that the word preceding the instruction is to be used in calculating recalls, lists, etc., whenever the word preceding it is sensed; such as "Expensive" "Same As" "Gucci", "Expensive" "Same As" "London". Note that (1) the word "Expensive" need not be preset in the circuit. If the user wishes to recall the day's receipts from what he calls "Expensive" shoes, then all shoes marked the same as "Expensive" will be used in the totals; and (2) several items may be called "Same As", such as "Expensive" being the "Same As" both Gucci and London; meaning that whatever request is made on "Expensive" such as receipts or quantities, will be made on both Gucci and London.

Recall: used similar to a general computer instruction, to call up from storage, or to call up from memory; but can be associated with links and defined terms, such as "Recall" "Quantity" "Link" "Gucci" "black" "size" "8½" "End Link".

Store: used similarly to a general computer instruction, to store in the defined storage, or temporary memory, etc.

Number: to tell the computer that a number will be spoken after it, and to refer to that word as a number, rather than as a definition of something, such as "Three" being assigned the title of a particular formula, but the "Number" "Three" as the mathematical quantity being requested.

Storage: self-explanatory; may be used as a pronoun with the storage location preceding it, such as "Storage" "X".

Replace A with B: replaces word or text "A" with word or text "B".

Duplicate: duplicates the requested program, such as "Duplicate" "PROJECTION". Used to duplicate programs to be used for assignment of other variables for use in other applications.

Execute: performs the requested action.

As mentioned, words or phrases may or may not be included for specific applications, to make programming easier for the user, but this in no way negates the fact that all more complicated algorithms may be created by the user from the minimum set.

For example, for use of the voice operated calculator in a supermarket: Dollars: used to define cash or receipts, as opposed to quantities. Cents: similar. Compare: a command used primarily for the supermarket shopper, to compare the quantity preceding it and indicating the greater or lesser of the two; such as "Compare" "Quart" "Two" "Dollars" "Fifty" "Cents" "With" "Gallon" "Three" "Dollars" "Fifteen"

"Cents"; "Display" "Less". Vocabulary: Cup, Ounce, Pound, Quart, Gallon, Gram, Kilogram, Less (than), More (than), With.

For the Forms Voice Typewriter: Set: a command to "set" "tab" positions. Type: a program to tell the computer the data inputted such as "Number" "3" is to be typed. Also used as the general command "Type". Tab: a noun if preceded by the word "Set"; to "Set Tab" locations. Tab: a command which compiles the ASCII code for tabbing on a typewriter and to instruct the typewriter to move to the previously defined position, such as "Set Tab" "Line" "Fifteen" "Space" "Thirty-One"; the command "Tab", therefore, moving the typewriter carriage automatically to line 15, space 31.

Backspace: self-explanatory; can be used with a number or word preceding it, such as "3" "Spaces" "Backspace"; or "4" "lines" "Backspace".

Forward Space: identically forward.

Erase: to erase the previous notation; or can be used with words or numbers preceding it, such as "Erase" "Line" "Fifteen" "Space" "Thirty-Three".

Line: self-explanatory.

Upper Case: self-explanatory.

Lower Case: self-explanatory. Note that all symbols may be defined by the user according to the typewriter he is using; thus, "Assign" "Upper" "Case" "Seven" "Asterisk" will tell the circuit to transmit an upper case seven signal every time an asterisk is requested.

For CAD/CAM and N/C machine applications:

Coordinates: tells the circuit that X, Y and Z values follow.

Move: tells the machine and/or cursor to move to a particular coordinate.

Draw: tells the circuit to generate a signal, previously defined, which the machine or CRT recognizes as draw.

For Remote Machine Control Applications:

Vocabulary: Volt, Current, Amp, Watts, Valve, Switch.

An additional capability exists, and is described with the sub-mode called "Alternate Free Speech Store Mode". This is the second of two modes of Execute, the first being "Primary Execute".

In both the Training and Execute mode, A one-to-two-second time-out of detected energy is used to separate words. Thus, if a user were to say "Inter" "Grate" because his speech pattern happened to separate the two syllables of the word "Integrate", the separation would not be such as to have the software consider the word as two words. Thus, speaking deliberately and clearly is obviously of benefit. Recalling the fact that in the example, Gucci was assigned to "A", size 8½ to "B", etc., it should be noted that an alternate, albeit more difficult method to create a program, is possible.

If in this mode the nonrecognition portion of the circuitry was disabled, and a new store command, for this sub-mode only, was created, which permitted digitizing and storage of any word or series of words spoken, even if not recognized, until the words "End Store" was sensed, then the word "Gucci" or a string of words could be spoken into the circuit, digitized, and stored. If, in this more difficult case, the user said "Assign" "Ten" "Gucci", then the quantity "Ten" could be associated with the word "Gucci"; and if further "Assigns" of quantities did not erase, but appended themselves to the assignor, then "Ten", "Thirty", and "Ten" could be assigned to Gucci and a "TOTAL" command given to total all assignments to "Gucci" (50) (giving possibly the number of Gucci shoes sold, or Gucci shoes in storage, etc.). But this, as described, would limit the further use of any created programs, since every variable: "Gucci" "Sizes" "Colors", etc., would have to be changed for hats, or ties, or shirts. Using alphabet assignments obviously is more useful.

This sub-mode, however, can be used to store free speech. Since the nonrecognition circuitry is disabled, and the algorithm is preset for this mode to continue to digitize and store until the "End Store" instruction is recognized, then entire texts may be stored. Theoretically, Lincoln's Gettysburg Address could be stored and spelled, letter for letter, and space for space, and displayed as running text on the LED or printed on a printer, and some user might indeed wish to do this (to include the text as part of a letter, etc.), but the more obvious use of the free speech capability would be to store brief sentences, spelled letter for letter, for use with the Forms-Voice Typewriter.

Thus, if a government worker had to include as part of her completion of a form, a choice of three short sentences such as:

1. Denied credit because of poor credit history.
2. Denied credit because of poor employment history.
3. Denied credit because of past bankruptcy.

then these three sentences may be spoken into the circuit in this sub-mode, just as written; the command "Spell" and "End Spell" used to spell, letter for letter, and space for space each sentence; the "Same As" command used to assign the number "one" to the first sentence, "two" to the second sentence and "three" to the third sentence, and, when the user required typing of one of these reasons in the form, she would simply say "Type" "Sentence" "Three" and the proper sentence would be typed on the form.

Many modifications and alterations may be made by those having ordinary skill in the art without departing from the spirit and scope of the invention. Therefore, it must be understood that the illustrated embodiment has been set forth only for the purposes of example and clarity, and should not be read as limiting the invention as defined in the following claims. The invention as claimed expressly includes not only the literal elements claimed, but all equivalents thereto which function in any manner to obtain the same result.

I claim:

1. A method for providing a user-defined computer language executed in a keyless and mouseless computer, for use in controlling a device, comprising the steps of:

sequentially displaying a first plurality of commands, said first plurality of commands comprising a minimum set of prestored instructions, said minimum set of instructions being a minimum number of instructions necessary for said user to perform all functions implementable by said computer with respect to an arbitrary problem to which said computer is applied;

contemporaneously and sequentially detecting a first plurality of audible commands, said first plurality of audible commands corresponding to said first plurality of displayed commands;

converting each of said detected audible commands into a digital signal;

storing each of said digital signals corresponding to said first plurality of audible commands to comprise a plurality of digital signals corresponding to said minimum number of instructions, termed the minimum instructions;

uniquely associating each of said digital signals with a predefined digital command stored in said computer to perform one of said minimum instructions, said first plurality of audible commands being uniquely associated with said first plurality of displayed commands and corresponding predefined digital commands without separate mouse or keyboard input and not dependent upon independently associating any language structure with any application software, detecting a second plurality of audible commands, said second plurality of audible commands being arbitrarily determined by said user;

converting each of said detected second plurality of audible commands into a digital signal;

storing each of said digital signals corresponding to said second plurality of audible commands to comprise said user-defined computer language, so that said user-defined computer language begins to be structured by said digital signals corresponding to said second plurality of audible commands corresponding in turn to one or more of said minimum instructions;

detecting sequences which each include a new audible command from said second plurality, and more than one chosen audible command from the first and second pluralities, said sequences to be termed audible macrocommand creation sequences;

in response to each said audible macrocommand creation sequence, further associating said new audible command for that sequence with said ones of said minimum instructions associated with said chosen audible commands for that sequence;

recognizing said user's repeat use of each of the audible commands in the second plurality, after said steps of associating, and executing said minimum instructions associated with all recognized audible commands.

2. A keyless and mouseless computer, for use in controlling a device, comprising:

means for sequentially displaying a first plurality of commands, said first plurality of commands comprising a minimum set of prestored instructions, said minimum set of instructions being a minimum number of instructions necessary for said user to perform all functions implementable by said computer with respect to an arbitrary problem to which said computer is applied;

means for contemporaneously and sequentially detecting a first plurality of audible commands, said first plurality of audible commands corresponding to said first plurality of displayed commands;

means for converting each of said detected audible commands into a digital signal;

means for storing each of said digital signals corresponding to said first plurality of audible commands to comprise a plurality of digital signals corresponding to said minimum number of instructions, termed the minimum instructions;

means for uniquely associating each of said digital signals with a predefined digital command stored in said computer to perform one of said minimum instructions, said first plurality of audible commands being uniquely associated with said first plurality of displayed commands and corresponding predefined digital commands without separate mouse or keyboard input and not dependent upon independently associating any language structure with any application software;

means for detecting a second plurality of audible commands, said second plurality of audible commands being arbitrarily determined by said user;

means for converting each of said detected second plurality of audible commands into a digital signal;

means for storing each of said digital signals corresponding to said second plurality of audible commands to comprise said user-defined computer language, so that said user-defined computer language begins to be structured by said digital signals corresponding to said second plurality of audible commands corresponding in turn to one or more of said minimum instructions;

means for detecting sequences which each include a new audible command from said second plurality, and more than one chosen audible command from the first and second pluralities, said sequences to be termed audible macrocommand creation sequences;

means for, in response to each said audible macrocommand creation sequence, further associating said new audible command for that sequence with said ones of said minimum instructions associated with said chosen audible commands for that sequence;

means for recognizing said user's repeat use of each of the audible commands in the second plurality, and means for executing said minimum instructions associated with all recognized audible commands.

* * * * *